(12) United States Patent
Johnston (10) Patent No.: US 6,920,757 B2
(45) Date of Patent: *Jul. 26, 2005

(54) WATER DISPLACEMENT APPARATUS

(76) Inventor: Gary Lawrence Johnston, P.O. Box 183, Cowarts, AL (US) 36321

( * ) Notice: Subject to any disclaimer, the term of this patent is extended or adjusted under 35 U.S.C. 154(b) by 0 days.

This patent is subject to a terminal disclaimer.

(21) Appl. No.: 10/667,584

(22) Filed: Sep. 22, 2003

(65) Prior Publication Data

US 2004/0055301 A1 Mar. 25, 2004

Related U.S. Application Data

(63) Continuation-in-part of application No. 10/232,263, filed on Aug. 29, 2002, now Pat. No. 6,651,435.

(51) Int. Cl.[7] .............................................. F03G 6/00
(52) U.S. Cl. ................................. 60/641.11; 60/641.15
(58) Field of Search .............................. 60/398, 641.8, 60/641.11, 641.15

(56) References Cited

U.S. PATENT DOCUMENTS

| | | | | |
|---|---|---|---|---|
| 4,041,707 A | * | 8/1977 | Spector | 60/641.14 |
| 4,055,950 A | * | 11/1977 | Grossman | 60/398 |
| 4,583,368 A | * | 4/1986 | Neuenschwander | 60/639 |
| 6,651,435 B1 | * | 11/2003 | Johnston | 60/641.11 |

* cited by examiner

Primary Examiner—Hoang Nguyen (57) ABSTRACT

A water displacement apparatus is provided which uses the heat from the sun to displace water from a water collection means. The water collection means has a water container member which may be partially submerged in a water reservoir, or connected to a remote reservoir of water. The water container member has a water transport member connected to it, through which water from the water reservoir may move into the water container member. The water from the reservoir will move into the water container member as the sun evaporates water from the water container member, since the water levels will naturally try and reach equilibrium. An electricity generation means may be operatively connected to the water collection means in such a manner that the movement of the water through said water transport member may be used to generate electricity. In an alternate configuration, a water condenser means may be connected to the water collection means in such a manner that the evaporated water may be transformed back into liquid form, for use as drinking water and/or industrial water. The electricity generation means and the water condenser means may be used together with the water collection means, or as individual components. Multiple systems may be connected together so that larger amounts of water can be evaporated, allowing for faster water movement through the water collection means, which increase electricity generation and also allows larger amounts of evaporated water to get condensed back into liquid form. A conventional windmill type of water displacement mechanism may also be utilized to displace water from within the water container member. In this instance, the wind, instead of the sun, is utilized to generate the electricity.

12 Claims, 15 Drawing Sheets

WATER DISPLACEMENT APPARATUS

CROSS-REFERENCE TO RELATED APPLICATION

This application is a Continuation-In-Part to U.S. patent application Ser. No. 10/232,263, filed Aug. 29, 2002 now U.S. Pat. No. 6,651,435.

BACKGROUND OF THE INVENTION

This invention relates to a water displacement apparatus which has a sunlight beam channeling means for channeling and concentrating the heat rays of the sun into a water filled container. The water filled container may be surrounded by a reservoir of water, or may be connected to a reservoir of water. As the heat rays of the sun are channeled and concentrated into the water in the water filled container, the water will begin to evaporate, with water from the reservoir moving into the container through an inlet, thus constantly replenishing the water filled container with new water. The movement of reservoir water into the water container may be used to turn an electric generator for producing electricity. Also, the evaporated water may be channeled through a condenser, so that it may be converted back into liquid form for drinking and/or for industrial use.

SUMMARY AND OBJECTS OF THE INVENTION

It is the object of this invention to provide a water displacement apparatus which may provide an inexpensive and clean way of producing electricity and/or condensed water. The main purpose of this application is to demonstrate an apparatus which performs the stated function, and to demonstrate the many options and configurations this apparatus may take on.

Briefly stated, the apparatus that forms the basis of the present invention comprises a frame structure means, a beam channeling means, a water collection means, an electricity generating means, and a water condenser means. The beam channeling means and the water collection means may all be mounted upon the frame structure means. The electricity generating means and a water condenser means may also mount on the frame structure means. However, it may be possible to mount the beam channeling means, the water collection means, the electricity generating means, and the condenser means, on individual frame structure means.

The design of the apparatus is such that the beam channeling means channels and concentrates the heat rays of the sun into the water collection means. The water in the water collection means will heat up, and then begin to evaporate. The water collection means may have an inlet submerged in, or connected to, a water reservoir. As the water inside the water collection means begins to evaporate, water will begin to move into the water collection means via the inlet. An electricity generating means operatively connected to the inlet means may utilize this water movement to generate electricity. Thus electricity may be generated in a very clean and efficient manner. Also, the evaporated water may be channeled through a water condensation means, so that the evaporated water may be converted back to liquid form. The intended purpose of the apparatus is to generate electricity, but other uses, such as condensing evaporated water back into liquid form, may also be a purpose. There are also many other uses for the water evaporation apparatus which will be obvious for someone in a similar industry.

Other objects, features, and advantages for this invention will be apparent from the following detailed description and the appended claims, references being made to the accompanying drawings forming a part of the specification, wherein like reference numerals designate corresponding parts of the several views.

DETAILED DESCRIPTION OF THE PREFERRED EMBODIMENT

Before explaining in detail the present invention, it is to be understood that the invention is not limited in its application to the details of construction or arrangement of parts illustrated in the accompanying drawings, since the invention is capable of other embodiments and of being practiced or carried out in various ways. Also, it is to be understood that the phraseology and terminology employed herein is for the purpose of description, and not limitation.

Figure 1A:
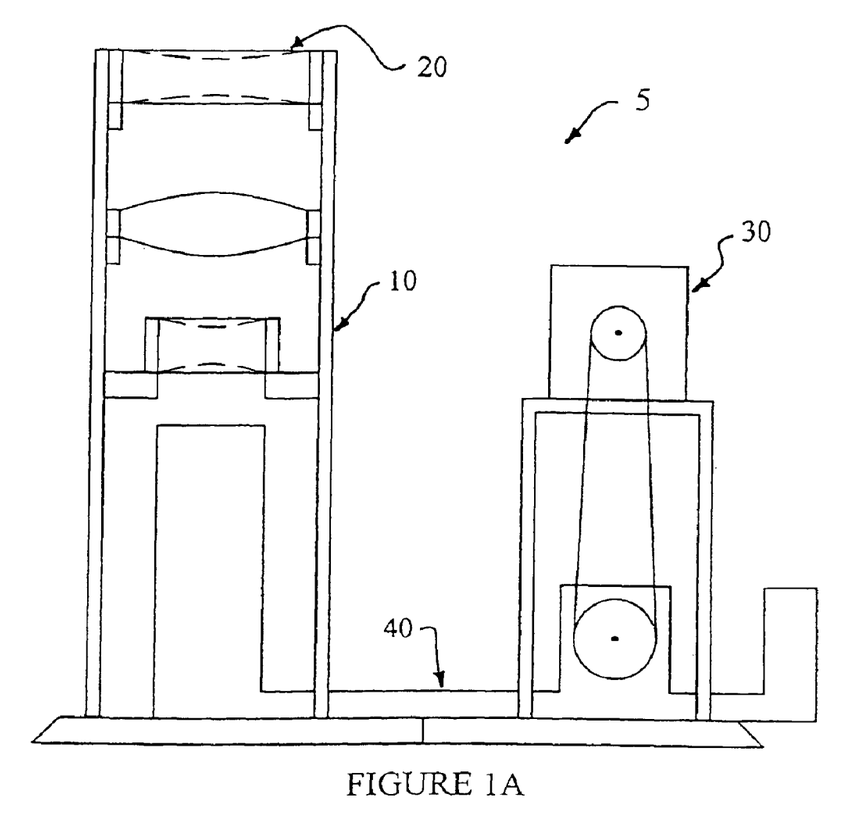
FIG. 1A is a front view of the water displacement apparatus.
Figure 1B:
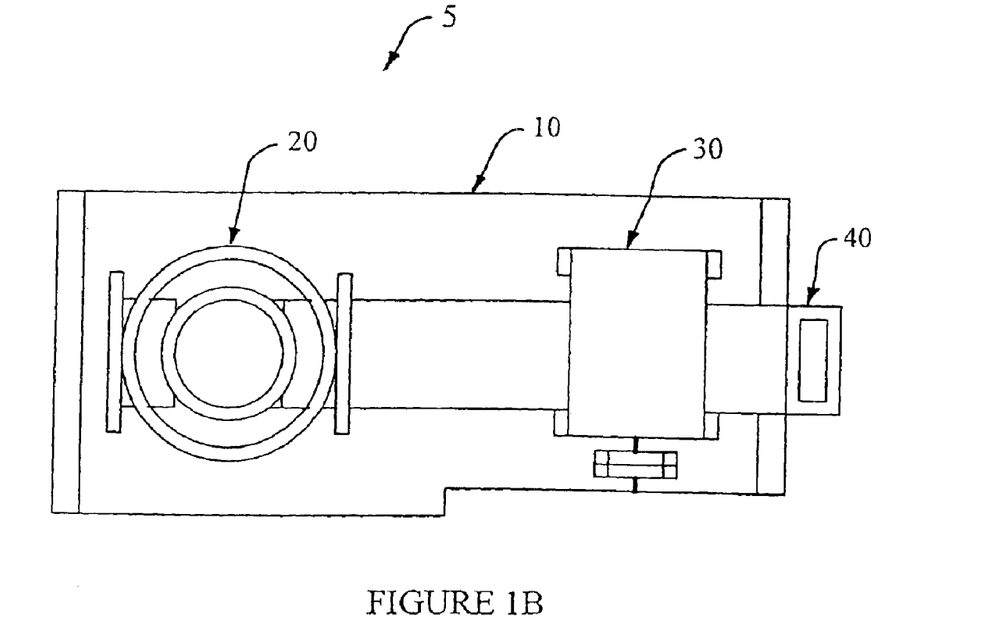
FIG. 1B is a top view of the water displacement apparatus.
Figure 1C:
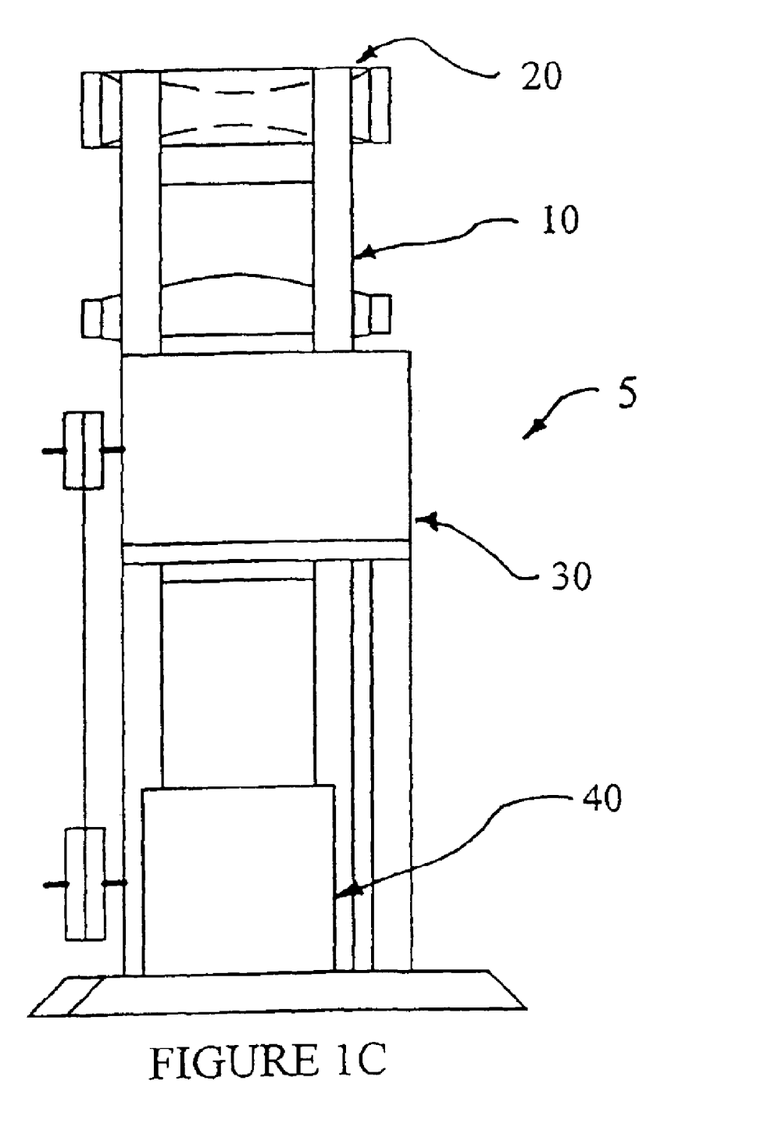
FIG. 1C is a side view of the water displacement apparatus.

As best can be seen by references to the drawings, and in particular to FIGS. 1A–1C, the water displacement apparatus that forms the basis of the present invention is designated generally by the reference numeral 5, and includes a frame structure means 10, a water collection means 40, a beam channeling means 20, and an electricity generation means 30. The water collection means 40, the beam channeling means 20, and the electricity generating means 30 are all preferably mounted on frame structure means 10. However, each could be mounted to its own frame structure, and the apparatus would also operate as intended.

Figure 2A:
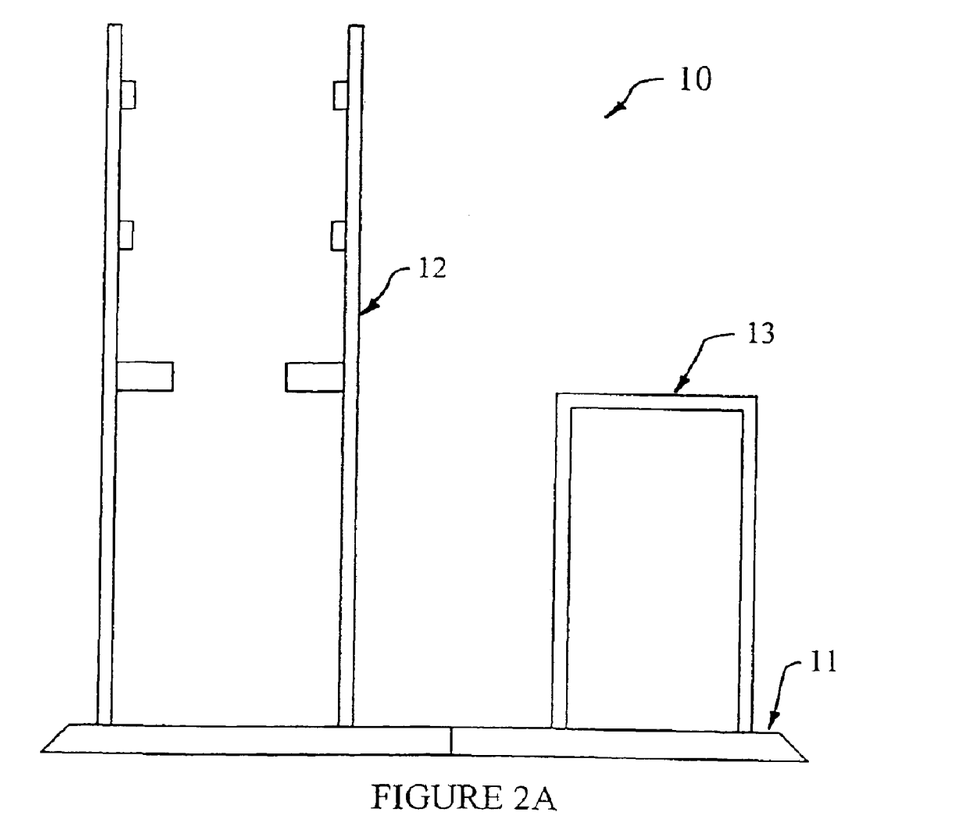
FIG. 2A is a front view of the frame structure means of the water displacement apparatus.
Figure 2B:
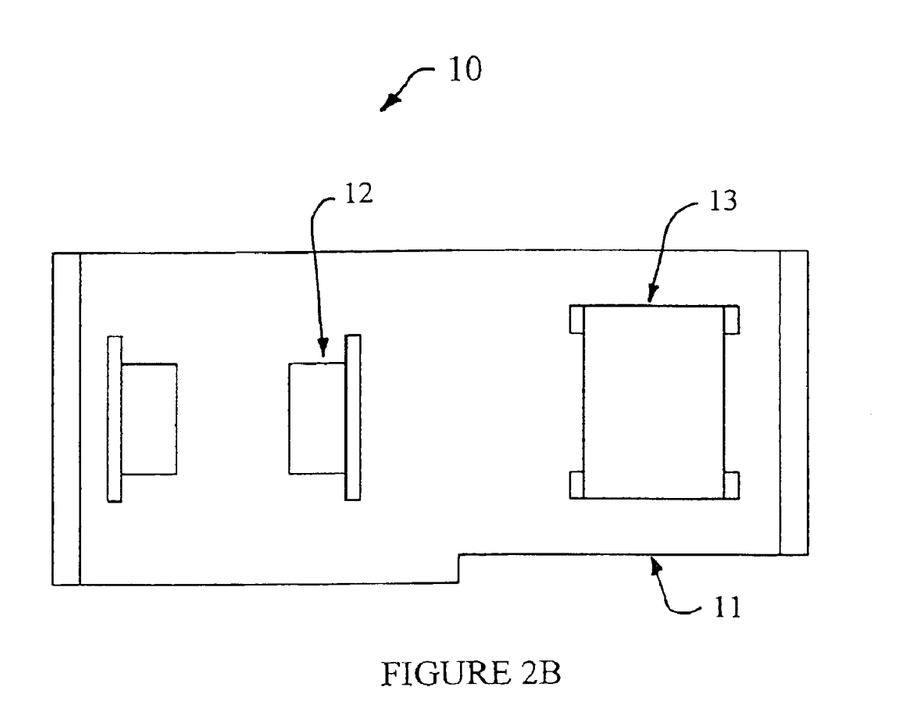
FIG. 2B is a top view of the frame structure means of the water displacement apparatus.
Figure 2C:
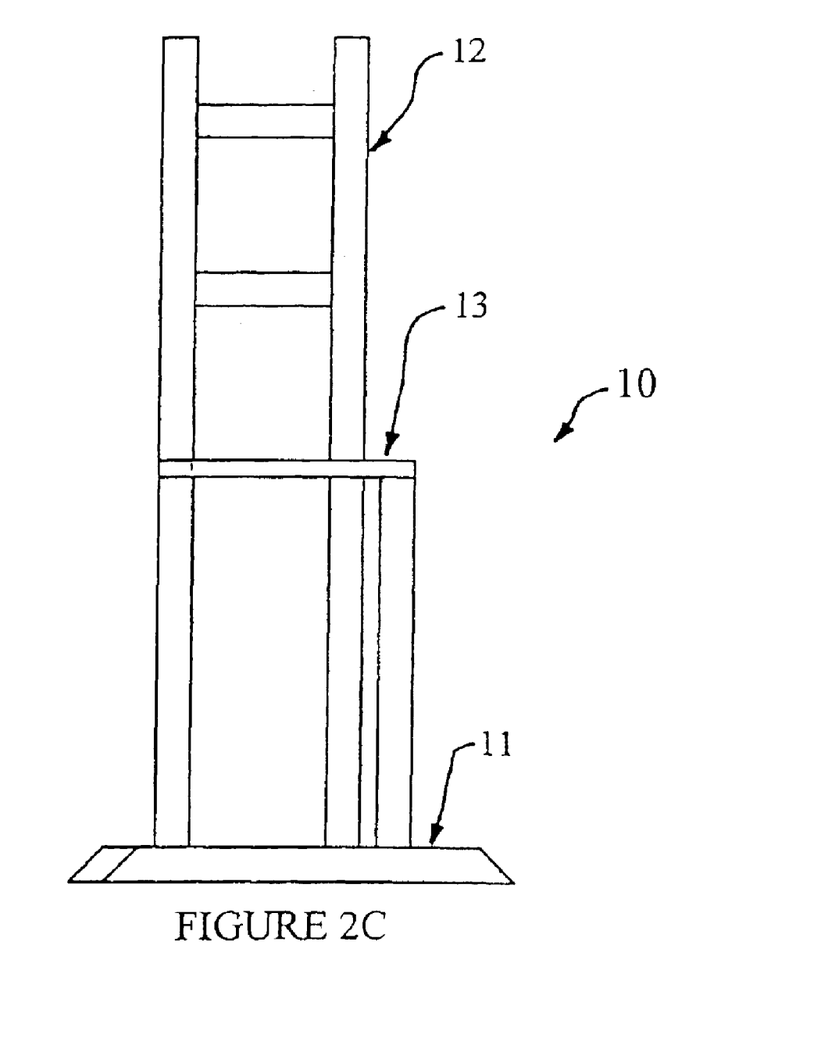
FIG. 2C is a side view of the frame structure means of the water displacement apparatus.

As may been seen in FIGS. 2A–2C, frame structure means 10 may comprise a base 11, a channeling support member 12, and a generator support member 13. The water collection means 40 mounts on the base 11. The beam channeling means 20 mounts of the channeling support member 12, while the electricity generation means mounts on the generator support member 13.

Figure 3A:
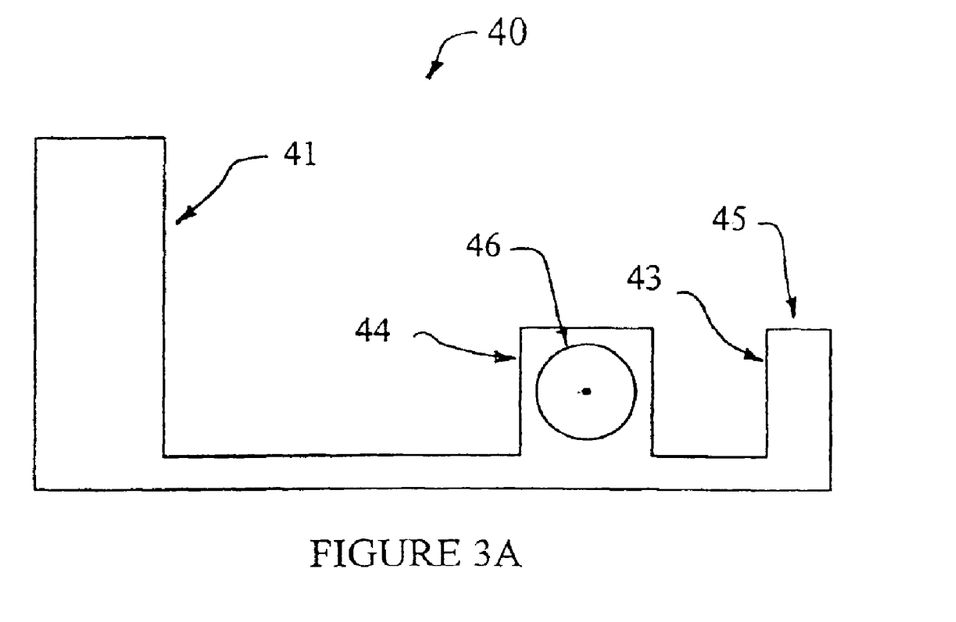
FIG. 3A is a front view of the water collection means of the water displacement apparatus.
Figure 3B:
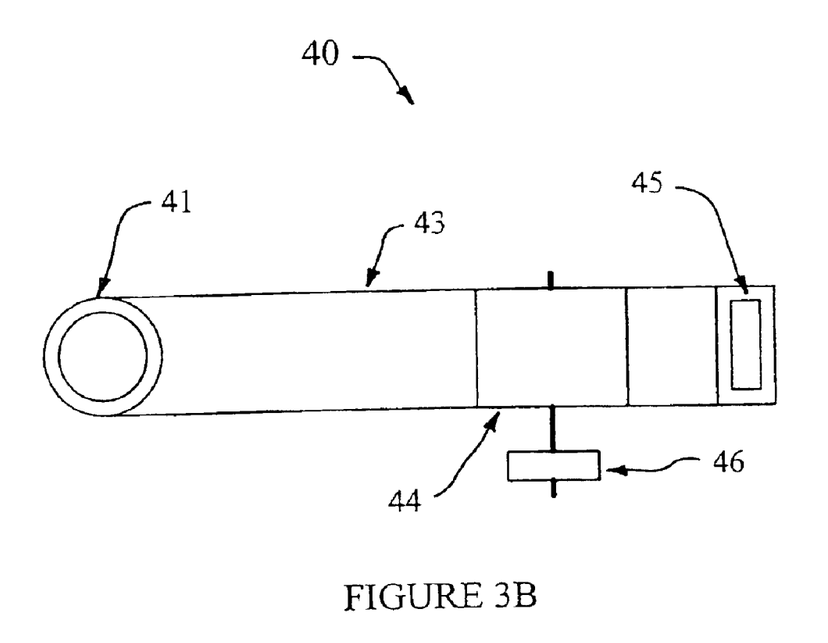
FIG. 3B is a top view of the water collection means of the water displacement apparatus.
Figure 3C:
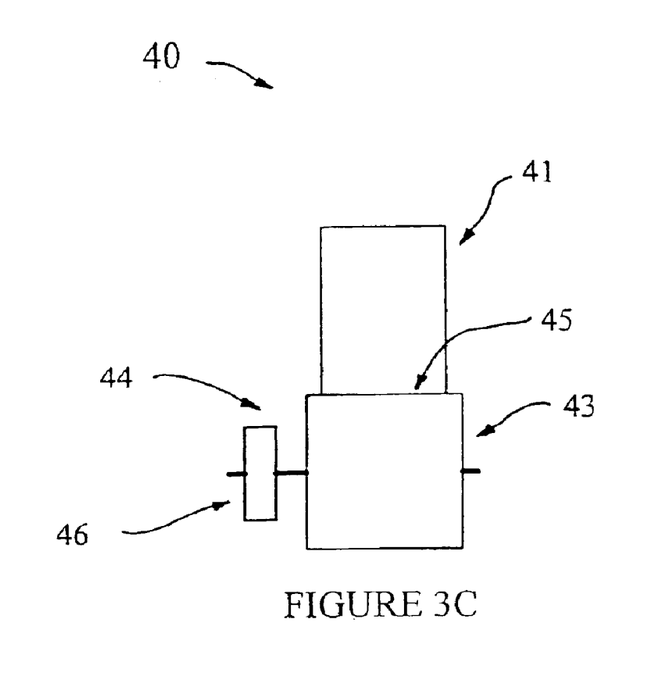
FIG. 3C is a side view of the water collection means of the water displacement apparatus.

FIGS. 3A–3C demonstrates the water collection means 40, which includes water container member 41 having an open end 42, water transport member 43 having an open end 45, and the rotation means 44. Water rotation means 44 includes a rotatable member 46 mounted to a water engaging member, which is enclosed within the water collection means and will be described later in the specification. Both the water container member 41 and water transport member 43 are hollow structures, allowing water to move within. The water container member 41 is a generally upright structure while the water transport member 43 serves as an inlet means for allowing water to enter the water container member 41.

Figure 4A:
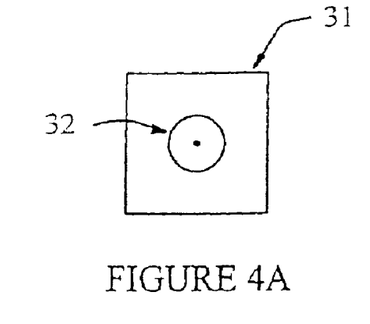
FIG. 4A is a front view of the electricity generation means of the water displacement apparatus.
Figure 4B:
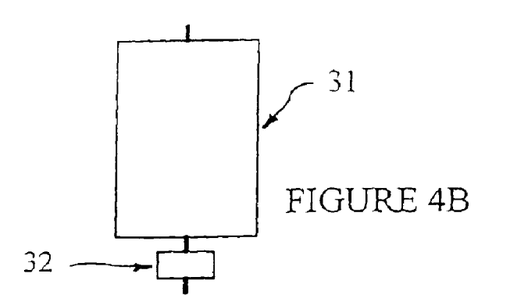
FIG. 4B is a top view of the electricity generation means of the water displacement apparatus.
Figure 4C:
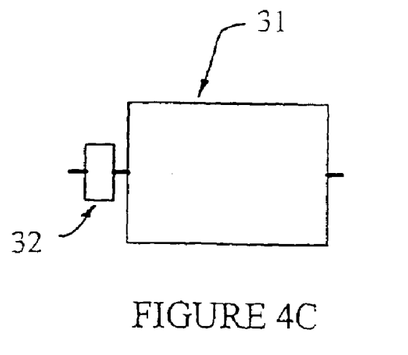
FIG. 4C is a side view of the electricity generation means of the water displacement apparatus.
Figure 5A:
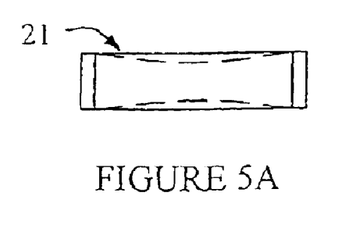
FIG. 5A is a front view of the diverging lens member of the beam channeling means of the water displacement apparatus.
Figure 5B:
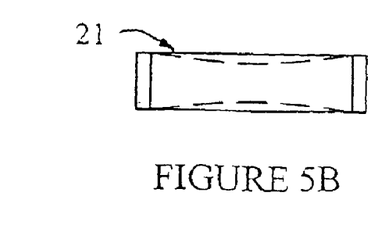
FIG. 5B is a top view of the diverging lens member of the beam channeling means of the water displacement apparatus.
Figure 5C:
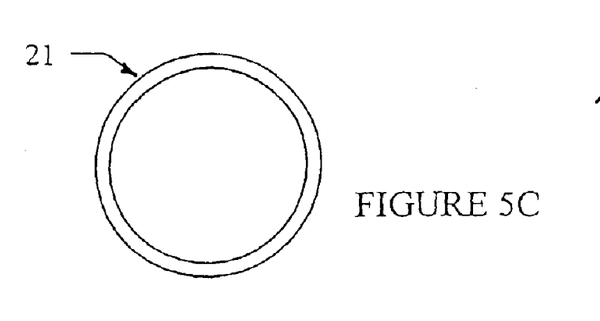
FIG. 5C is a side view of the diverging lens member of the beam channeling means of the water displacement apparatus.
Figure 6A:
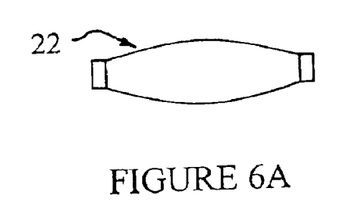
FIG. 6A is a front view of the converging lens member of the beam channeling means of the water displacement apparatus.
Figure 6B:
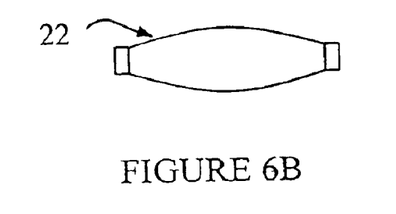
FIG. 6B is a top view of the converging lens member of the beam channeling means of the water displacement apparatus.
Figure 6C:
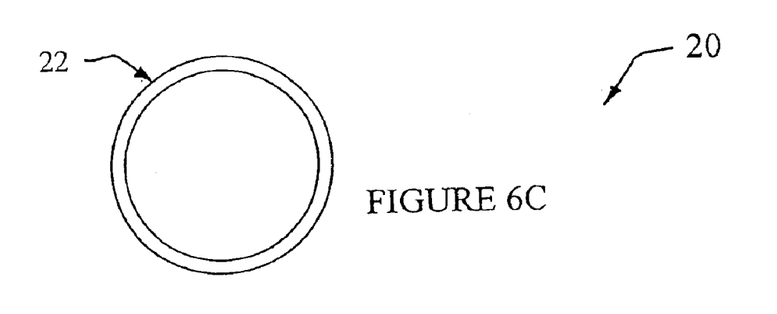
FIG. 6C is a side view of the converging lens member of the beam channeling means of the water displacement apparatus
Figure 7A:
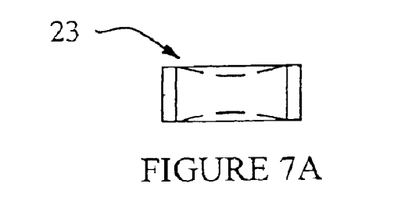
FIG. 7A is a front view of the second diverging lens member of the beam channeling means of the water displacement apparatus.
Figure 7B:
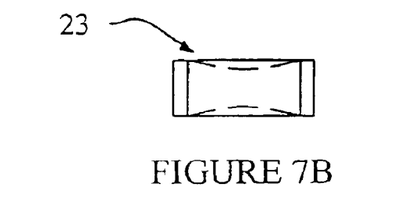
FIG. 7B is a top view of the second diverging lens member of the beam channeling means of the water displacement apparatus.
Figure 7C:
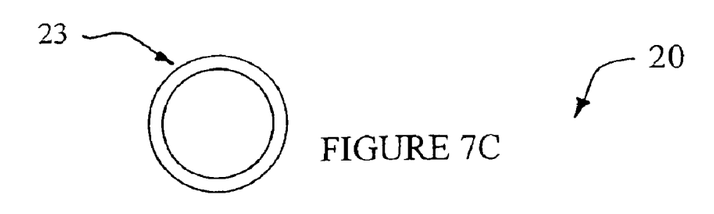
FIG. 7C is a side view of the second diverging lens member of the beam channeling means of the water displacement apparatus

As may be seen in FIGS. 4A–4C, the electricity generation means 30 includes a conventional electricity generator 31 commonly known in the industry. The electricity generator 31 has a rotatable member 32 mounted on the generator shaft.

FIGS. 5A–7C demonstrate the beam channeling means 20, which includes a diverging lens member 21, a converging lens member 22, and an optional diverging lens member 23. The function of the beam channeling means 20, along with the frame structure means 10, the water collection means 40, and the electricity generation means 30 may be seen in FIG. 8.

Figure 8:
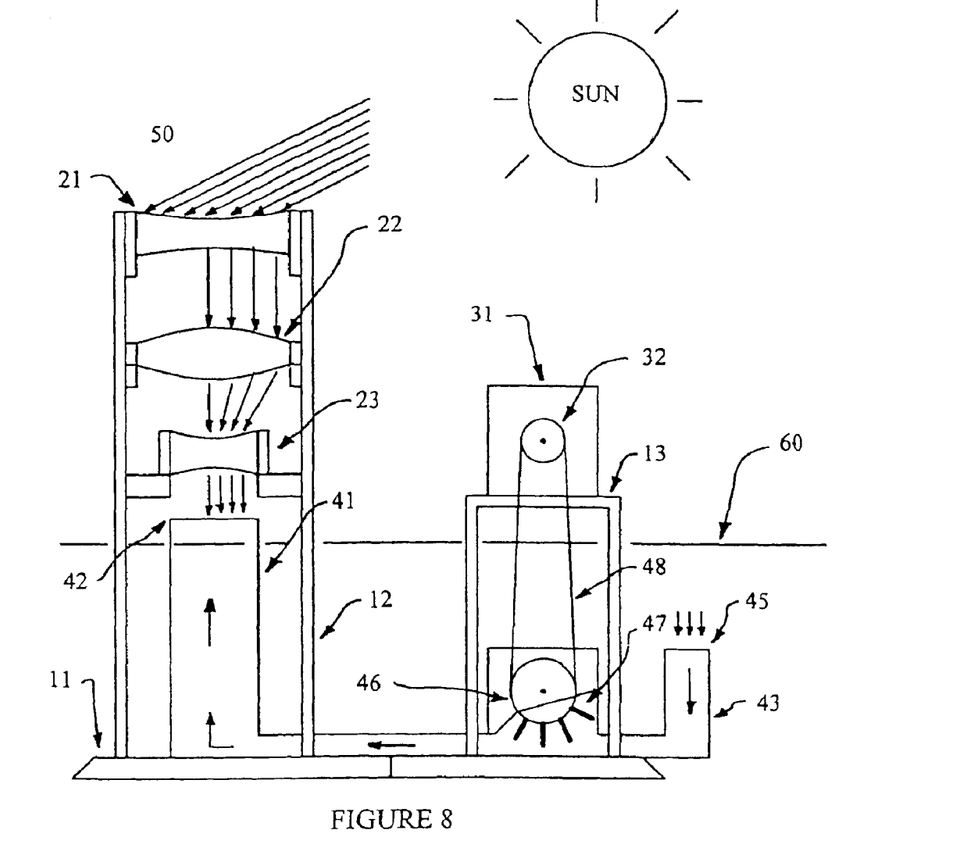
FIG. 8 is a side view of the water displacement apparatus demonstrating its operation in conjunction with an electricity generation means.

As shown in FIG. 8, the diverging lens member 21 will accept heat beams 50 from the sun at any angle, and channel those beams of heat downward. The converging lens member 22 will take the downward heat beams and concentrate them into a smaller area. This is similar to the way a magnifying glass may be used to concentrate sun beams onto an object so that the object becomes heated and, in some cases, can catch on fire. The optional diverging lens member 23 then channels the beams downward into the open end 42 of water collection member 41. Water collection means 40 may be partially submerged in a water reservoir 60. The open end 42 of the water container member 41 is higher than the level of water reservoir 60. When the beams from the sun heat up the water inside the water container member 41, the water will begin to evaporate, changing into steam, thus being displaced. As the water is displaced, the water reservoir 60 will refill the water container member 41 until the level in the container is equal to the level of the reservoir. The water enters the water transport member 43 through open end 45, which is submerged in the water reservoir 60. A water rotation means 44 is mounted to the water transport member 43. Rotation means 44 has a water engagement member 47, which turns when the water moves towards the water collection member 41. A rotatable member 46 is mounted to the water engagement member 47 so that it rotates in conjunction with the water engagement member 47. Water engagement member 47 is shown as a type of paddle wheel for demonstration purposes, but there are other types of devices which may be used in a similar manner. Rotatable member 46 is operatively connected to rotatable member 32 of electricity generation means 30 through closed loop connection member 48. Therefore as water engagement member 47 rotates, rotatable member 32 will rotate accordingly. Rotatable member 32 is mounted to electricity generator 31 so that electricity is generated as it rotates. Electricity generator 31 is a common type of generator well known in the industry, and using water movement to turn a generator is very common. Therefore, the evaporation or displacement of water from the water collection member 41 will be used to generate electricity in a much more cleaner and efficient manner. Multiple water rotation means 44 and electricity generation means 30 may be mounted to water transport member 43 to increase the amount of electricity that may be generated by the water displacement.

The diverging lens member 21 and the converging lens member 22 are shown as separate items, but a single lens could be manufactured which both channels and concentrates the heat beams. It would, in effect, be combining the two lens types together into a single lens. The optional diverging lens 23 is considered optional because it is not necessary, but should prove to provide a more even distribution of heat.

Figure 9:
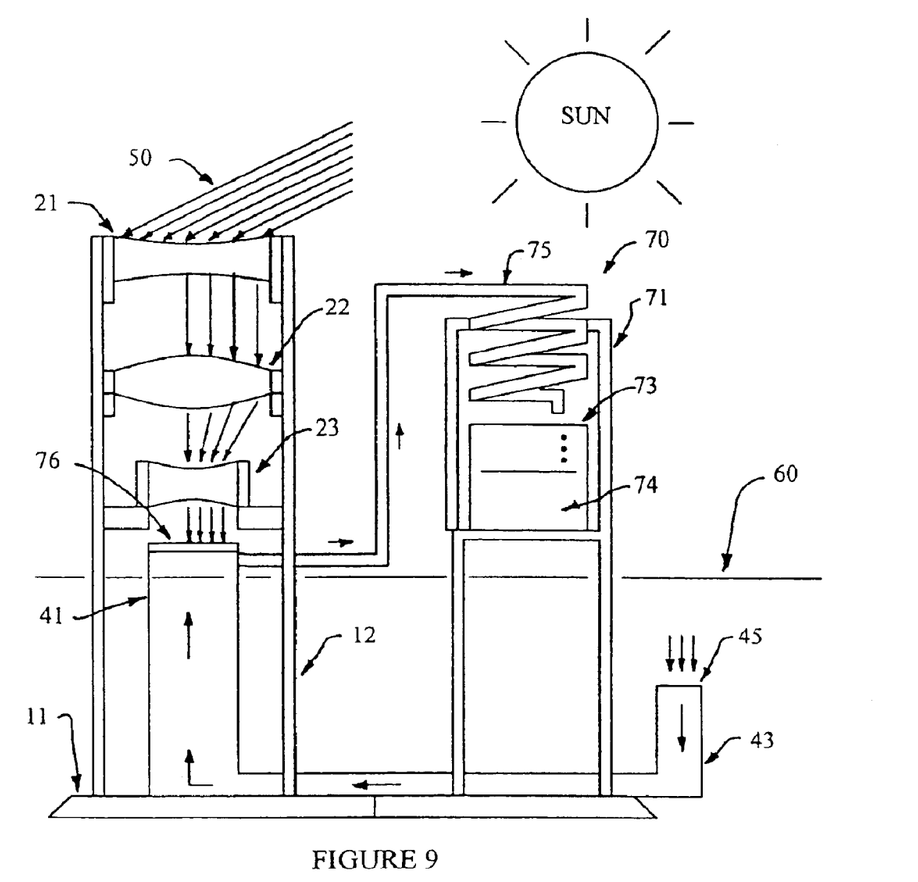
FIG. 9 is a side view of the water displacement apparatus demonstrating its operation in conjunction with a water condensation means.

As may be seen in FIG. 9, a water condenser means 70 may also operate in conjunction with the frame structure means 10 and the beam channeling means 20. The water condenser means 70 includes a condenser base 72 with condenser support member 71. A condenser container 73 will mount on condenser support member 71. In this configuration, the water collection member 41 will have a condenser clear cover 76 to cover the open end 42 of water container member 41, so that the evaporated water is directed through condenser tube 75, where it gets condensed back into water. The condensed water is collected in condenser container 73. The beam channeling means will again channel sun beams 50 into a concentrated area inside the water collection member 41. The water in that area will evaporate, and the evaporated water will naturally move upward. The condenser clear conver 76 will direct the evaporated water into condenser tube 75. Part of the condenser tube 75 may be a coiled tube, through which the evaporated water moves. As the evaporated water moves through the condenser tube 75, it will become cooled by the surrounding air, and water will start to form. A different cooling medium, such as dirt or water, may surround the tube coils to cool the evaporated water faster. There are additional items commonly known in the industry which may be part of the water condenser means and may be used to make the conversion of evaporated water back into liquid form more efficient. The water formed as a result of this conversion may be treated and used for drinking and/or industrial use. Other types of water condensers exist in the industry, and may be used in conjunction with the frame structure means and the beam channeling means. The condenser means described is mainly for demonstration purpose.

Figure 10:
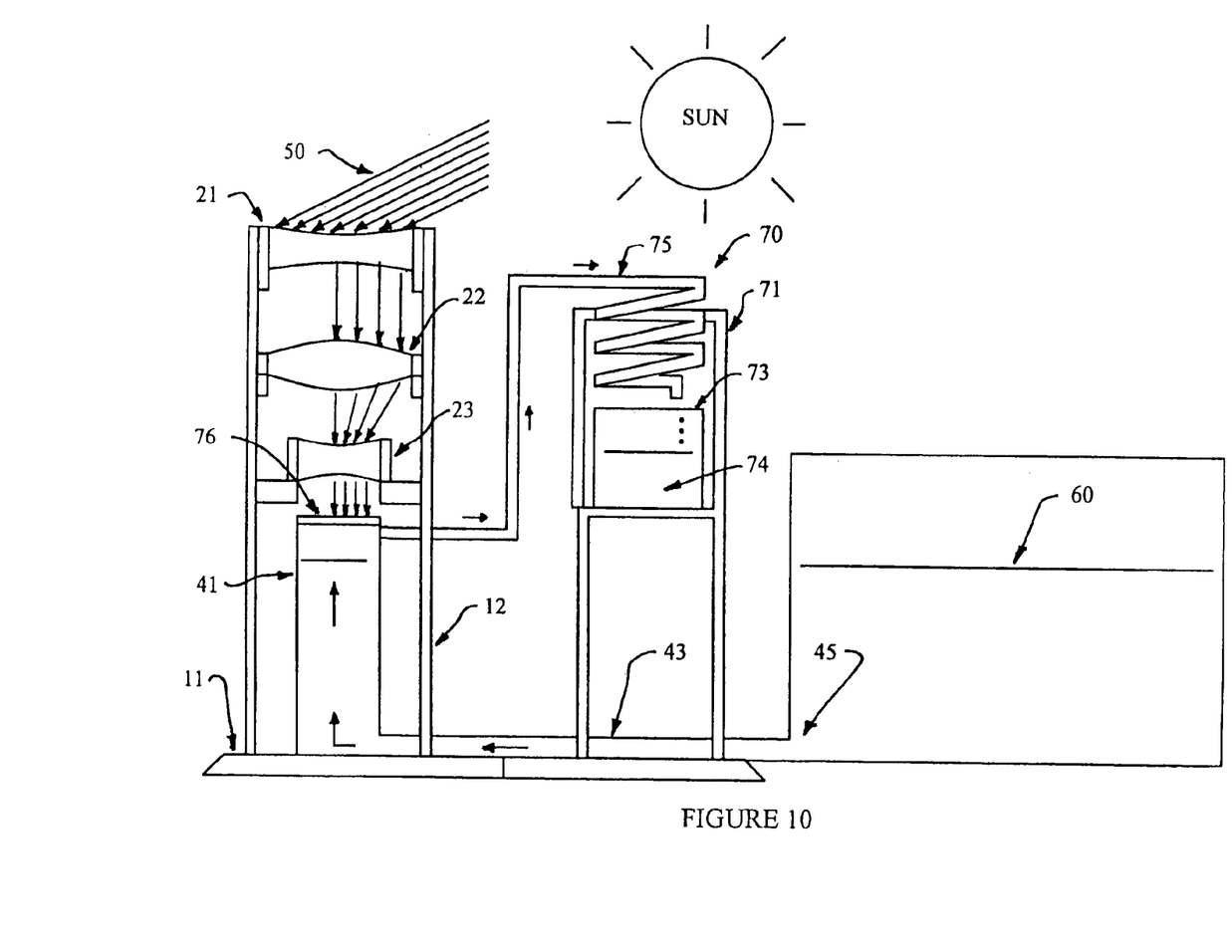
FIG. 10 is a side view of the water displacement apparatus demonstrating a water reservoir not surrounding the water collection means.

FIG. 10 demonstrates a water reservoir 60 which does not surround the water collection means 40, but is connected through water transport member 43. This may prove to be more desireable when a water condenser means 70 is used with the apparatus.

Figure 11:
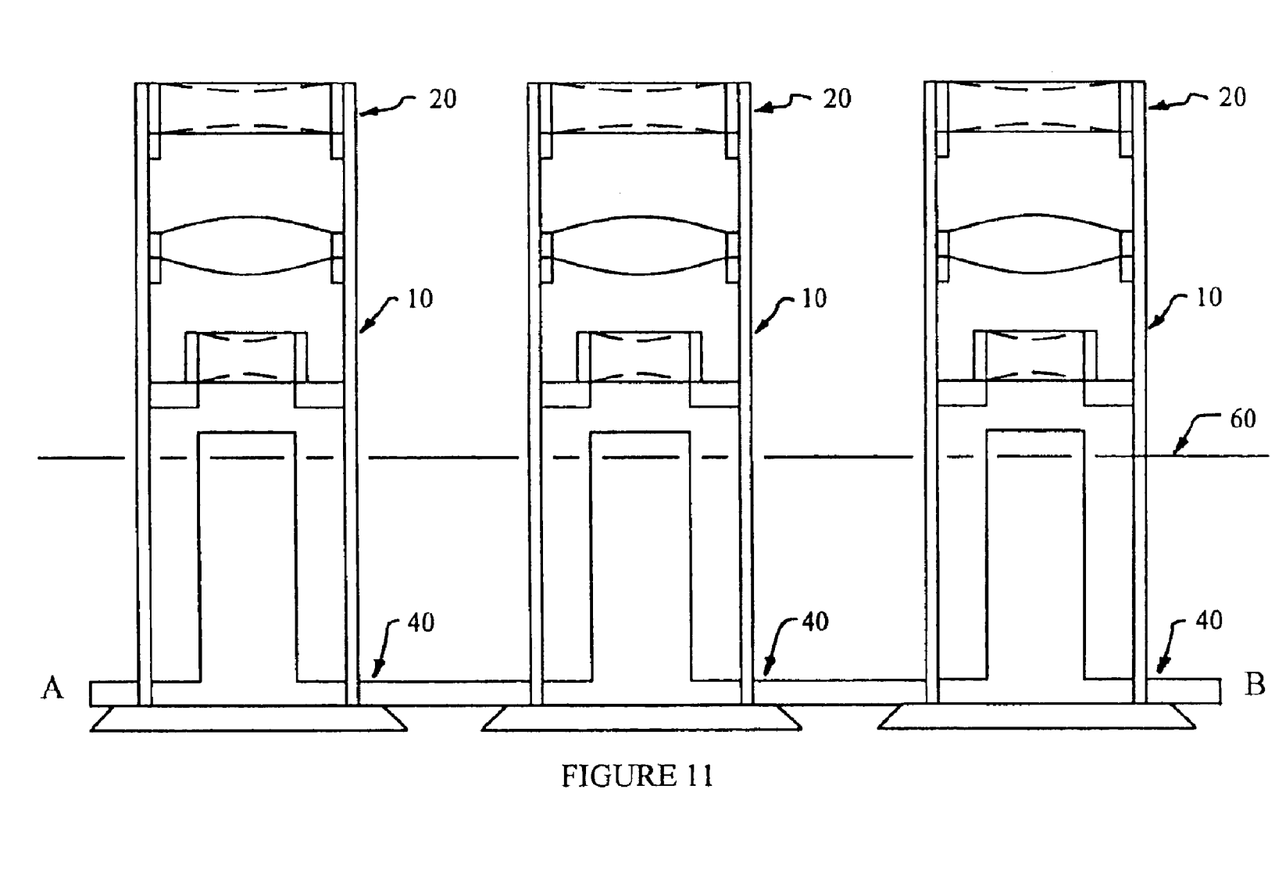
FIG. 11 is a side view of the water displacement apparatus demonstrating an apparatus utilizing multiple frame structure means, water collection means, and beam channeling means operatively connected together.

FIG. 11 demonstrates how several frame structure means 10, beam channeling means 20, and water collection means 40 may be operatively connected with one another so that larger amounts of water gets evaporated, and the movement of the water through the water transport member is faster. This multiple configuration may be necessary for producing enough water flow to turn an electric generator. The ends A and B of the water transport member may connect to additional frame structure means, beam channeling means, and water collection means, or to an electricity generation means and the accompanying water rotation means, or to a water condenser means, or to the water reservoir.

Figure 12:
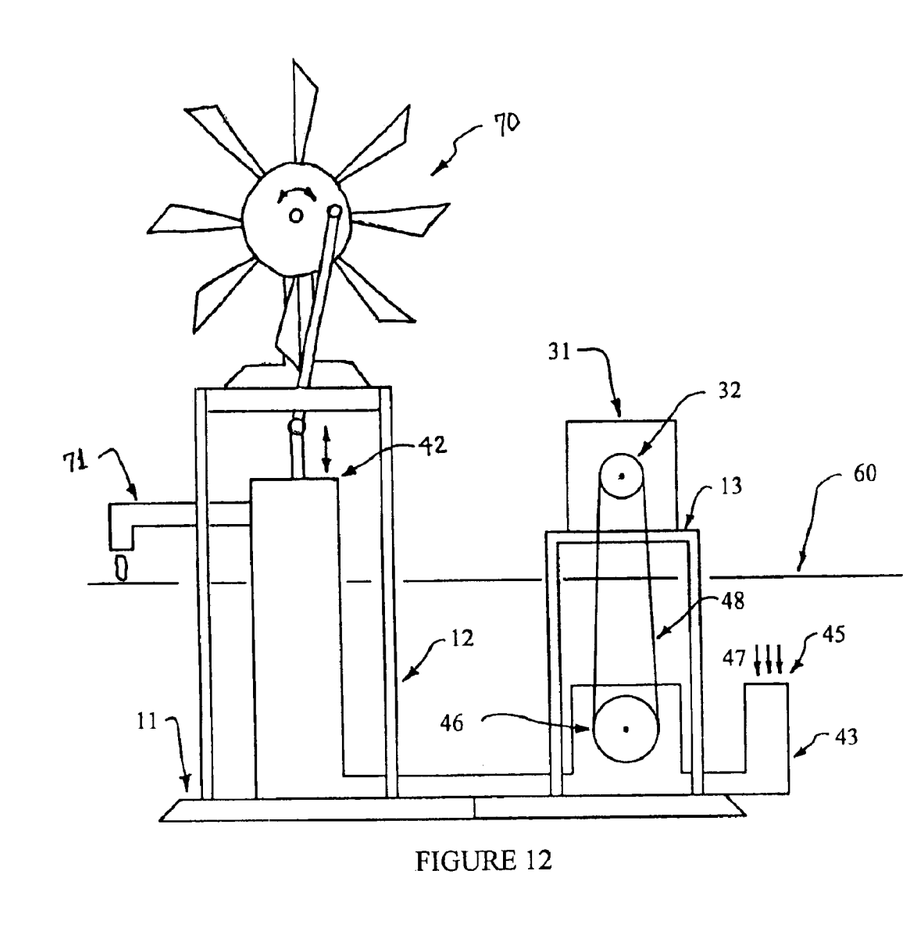
FIG. 12 is a side view of the water displacement apparatus demonstrating a conventional windmill type of displacement mechanism used to displace water from within the water container member.

FIG. 12 demonstrates a conventional windmill type of water displacement mechanism which may be used to displace water from within water container member 41. This may be used when the apparatus is configured for generating electricity. The displaced water may be returned to the water reservoir 60 through open end 42, or an alternative open end 71. As with the beam channeling means, multiple windmill mechanisms may be utilized, each displacing water from its own water container member, to increase the total amount of water displaced. Again, multiple water rotation means 44 and electricity generation means 30 may be mounted to water transport member 43 to increase the amount of electricity that may be generated by the water displacement.

As may be seen in the figures, the water rotation means of the water collection means is needed only when the electricity generation means is part of the apparatus. It does not need to be part of the water collection means when multiple units are connected together, as shown in FIG. 10, or when the water condensation means is a sole part of the apparatus, as shown in FIG. 9.

Many variations of the water displacement apparatus exist, along with the configurations described above. While it will be apparent that the preferred embodiment of the invention herein disclosed is well calculated to fulfill the objects above stated, it will be appreciated that the invention is susceptible to modification, variation, and change without departing from the proper scope or fair meaning of the subjoined claims.

I claim:

1. A water displacement apparatus comprising:
   a frame means;
   a water collection means comprising a water container member having an open end, said open end being open in the generally upward direction; and an inlet means for allowing water to enter said water container member at a location below said open end;
   a beam channeling means mounted to said frame structure means, said beam channeling means being positioned generally above said open end of said water container member;
   whereby heat beams from the sun may be channeled and concentrated into said open end of said water container member by said beam channeling means, said inlet means being connected to a water reservoir, said heat beams causing said water to evaporate from said water container member, such that said water from said water reservoir may move through said inlet means and into said water container member.

2. The water displacement apparatus as claimed in claim 1, said water collection means further comprising a water rotation means having a water engagement member, said water moving through said water transport member contacting said water engagement member, causing said water engagement member to rotate; said inlet means being a water transport member connected at one end to said water container member and said other end being open to said water reservoir, said water rotation means being mounted to said water transport member.

3. The water displacement apparatus as claimed in claim 2 further comprising an electricity generation means operatively connected to said water rotation means such said rotation of said water engagement means causes electricity to be produced by said electricity generation means.

4. The water displacement apparatus as claimed in claim 3, said water rotation means further comprising a rotatable member mounted to said water engagement member, said electricity generation means further comprising a rotatable member mounted to an electric generator, said rotatable members connected together by a closed loop connection member such that said rotatable members rotate simultaneously.

5. The water displacement apparatus as claimed in claim 1 further comprising a water condenser means, said water condenser means including a tube member connected to said water container member of said water collection means; and a clear cover mounted on said open end of said water container member; whereby heat beams are channeled through said clear cover and concentrated on said water in said water container member, such that evaporated water from said water container member moves through said tube member, with said evaporated water being sufficiently cooled as it travels through said tube so that it returns to a liquid form.

6. The water displacement apparatus as claimed in claim 1, said beam channeling means comprising a diverging lens member for channeling the beams from the sun in a generally downward direction, and a converging lens member mounted directly below said diverging lens member for concentrating the downward beams into a smaller area.

7. The water displacement apparatus as claimed in claim 6, said beam channeling means further comprising a diverging tens member mounted directly below said converging lens member for channeling the concentrated beams from the sun into a generally downward direction.

8. The water displacement apparatus as claimed in claim 1, said apparatus being part of a group of apparatuses connected together and utilizing the same inlet means, such that larger amounts of water may be displaced simultaneously in order that the water flow rate through said inlet means may be increased.

9. A water displacement apparatus comprising:

a frame means;

a water displacement means mounted to said frame means; said water displacement means comprising a diverging lens member for channeling the beams from the sun in a generally downward direction, and a converging lens member mounted directly below said diverging lens member for concentrating the downward beams into a smaller area;

a water collection means comprising a water container member having an open end; a water transport member connected at one end to said water container member, with the other end of said water transport member being open; and a water rotation means mounted to said water transport member;

an electricity generation means operatively connected to said water rotation means;

whereby said water within said water container member may be displaced through said open end of said water container member by said displacement means, said open end of said water transport member may be connected to a water reservoir such that water may move from said water reservoir into said water container member through said water transport member, and said movement of said water through said water transport member causing said water rotation means to rotate and produce electricity through said electricity generation means.

10. The water displacement apparatus as claimed in claim 9, said water rotation means further comprising a water engagement member having a rotatable member mounted thereon, said electricity generation means further comprising a rotatable member mounted to an electric generator, said rotatable members connected together by a closed loop connection member such that said rotatable members rotate simultaneously.

11. The water displacement apparatus as claimed in claim 9, said water displacement means further comprising a diverging lens member mounted directly below said converging lens member for channeling the concentrated beams from the sun into a generally downward direction.

12. The water displacement apparatus as claimed in claim 9, said apparatus being part of a group of apparatuses connected together and utilizing the same water transport member, such that larger amounts of water may be displaced simultaneously in order that the water flow rate through said water transport member may be increased.

* * * * *